(12) United States Patent
Dai et al.

(10) Patent No.: US 12,406,227 B1
(45) Date of Patent: Sep. 2, 2025

(54) MONOCULAR DEPTH PREDICTION AND OCCUPANCY CORRECTION SYSTEMS AND METHODS FOR ITEM STOW PROCESSES

(71) Applicant: Amazon Technologies, Inc., Seattle, WA (US)

(72) Inventors: Siyu Dai, Lynnwood, WA (US); Shantanu Thakar, Mountain View, CA (US); Ariel Gordon, Seattle, WA (US); Sisir Babu Karumanchi, Seattle, WA (US); Walter Gottlieb Bircher, Seattle, WA (US); Bhavana Mysore Chandrashekhar, Brier, WA (US); Ruinian Xu, Seattle, WA (US); Garrett Memoli, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 350 days.

(21) Appl. No.: 18/191,358

(22) Filed: Mar. 28, 2023

(51) Int. Cl.
| | |
|---|---|
| *G06Q 10/087* | (2023.01) |
| *G06T 7/10* | (2017.01) |
| *G06T 7/593* | (2017.01) |
| *G06V 10/141* | (2022.01) |

(52) U.S. Cl.
CPC ............ *G06Q 10/087* (2013.01); *G06T 7/10* (2017.01); *G06T 7/593* (2017.01); *G06V 10/141* (2022.01); *G06T 2207/10024* (2013.01); *G06T 2207/10028* (2013.01); *G06T 2207/20081* (2013.01); *G06T 2207/20084* (2013.01)

(58) Field of Classification Search
CPC ......... G06Q 10/087; G06T 7/10; G06T 7/593; G06T 2207/10024; G06T 2207/10028; G06T 2207/20081; G06T 2207/20084; G06V 10/141
See application file for complete search history.

(56) References Cited

U.S. PATENT DOCUMENTS

| | | | | |
|---|---|---|---|---|
| 11,768,504 | B2 * | 9/2023 | Ebrahimi Afrouzi .. | G06N 3/082 701/25 |
| 2013/0182904 | A1 * | 7/2013 | Zhang ................... | G06V 40/103 382/103 |
| 2021/0187741 | A1 * | 6/2021 | Marthi .................... | B25J 9/1676 |
| 2022/0019852 | A1 * | 1/2022 | Eyjolfsdottir ......... | G06T 17/205 |
| 2022/0187841 | A1 * | 6/2022 | Ebrahimi Afrouzi ....... G05D 1/0274 | |
| 2022/0309695 | A1 * | 9/2022 | Guizilini ................. | G06T 7/571 |
| 2022/0327777 | A1 * | 10/2022 | Buibas .................... | G06T 15/04 |
| 2023/0252637 | A1 * | 8/2023 | Xu ......................... | G06V 10/771 382/173 |
| 2023/0377180 | A1 * | 11/2023 | Ambrus .................. | G06T 15/20 |
| 2023/0386060 | A1 * | 11/2023 | Guizilini ................. | G06T 7/579 |

\* cited by examiner

*Primary Examiner* — Michael Jared Walker
(74) *Attorney, Agent, or Firm* — Athorus, PLLC

(57) ABSTRACT

Monocular depth prediction machine learning models may be trained to receive imaging data of inventory holders having translucent bands that at least partially occlude portions of compartments and items of the inventory holders. The monocular depth prediction models may process the imaging data to generate accurate and reliable depth maps for the inventory holders, while substantially ignoring or disregarding the translucent, partially occlusive bands. Further, the depth maps may be utilized by various occupancy correction models to improve determinations related to available storage space within compartments of the inventory holders, thereby improving the accuracy and efficiency of various material handling processes.

20 Claims, 9 Drawing Sheets

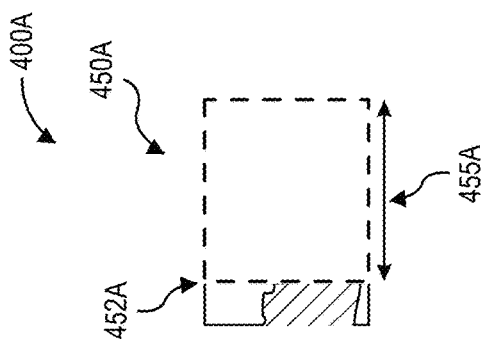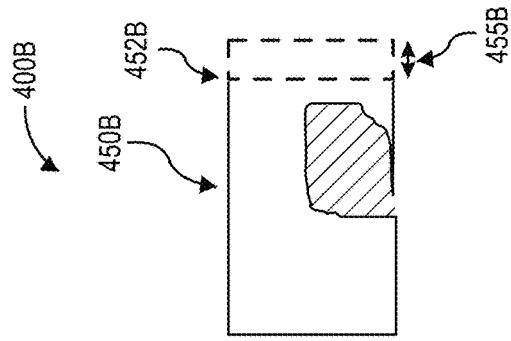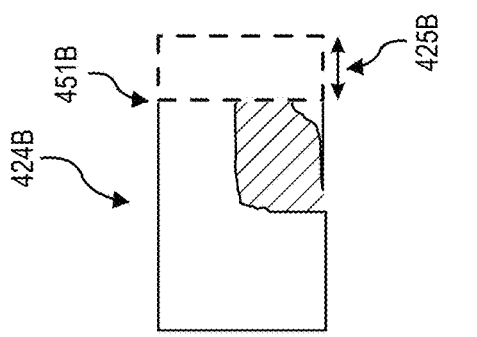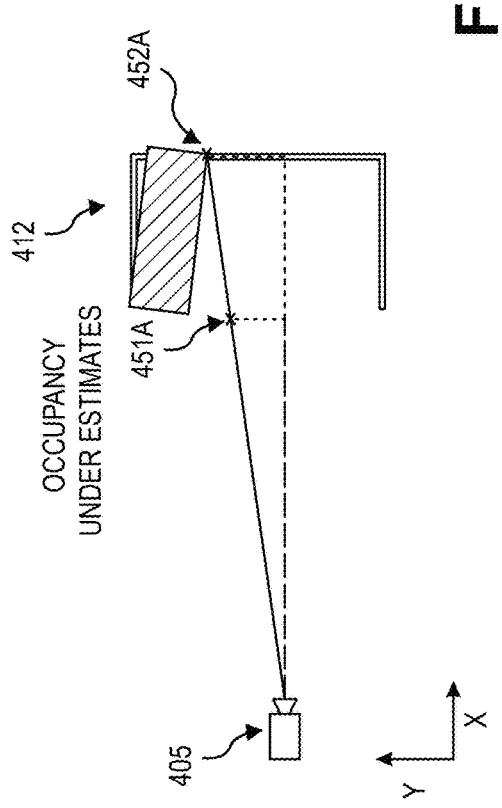
FIG. 4A
FIG. 4B

MONOCULAR DEPTH PREDICTION AND OCCUPANCY CORRECTION SYSTEMS AND METHODS FOR ITEM STOW PROCESSES

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes may stow, place, or store items in various inventory holders. However, conventional automated item stow systems and methods may not reliably and efficiently utilize available storage space. Accordingly, there is a need for automated systems and methods to reliably and efficiently recognize and utilize available storage space for items in various inventory holders of a material handling facility.

BRIEF DESCRIPTION OF THE DRAWINGS

FIGS. 4A-4B are schematic diagrams of an example occupancy correction process using perspective correction based on monocular depth prediction, in accordance with implementations of the present disclosure.

DETAILED DESCRIPTION

Figure 1A:
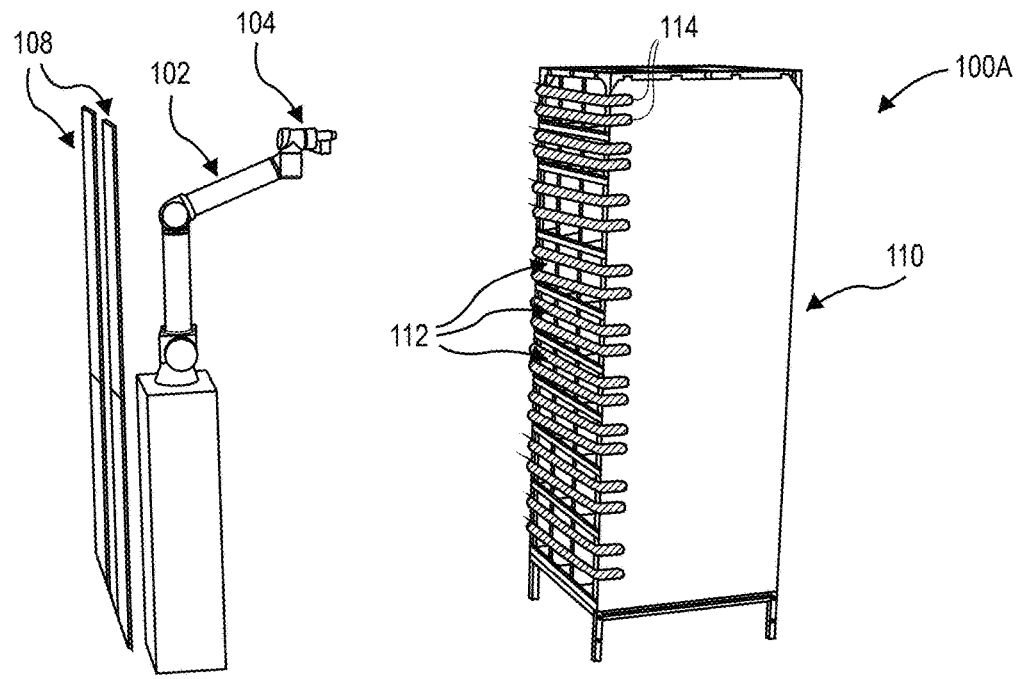
FIGS. 1A-1B are schematic diagrams of an example data collection system to enable monocular depth prediction, in accordance with implementations of the present disclosure.

As is set forth in greater detail below, implementations of the present disclosure are directed to monocular depth prediction and occupancy correction systems and methods to facilitate reliable and efficient automated item stow/storage processes and operations.

In example embodiments, inventory holders may comprise one or more bins, slots, or compartments configured to receive and store various items, products, or packages. In addition, the inventory holders may include one or more translucent, flexible, and elastic bands or retainers, e.g., retention bands, that retain items within the compartments and partially occlude open faces or sides of the compartments. Within individual compartments, one or more items may be placed, stowed, or stored, and the items may move substantially freely within the compartments, while retained by the retention bands.

In example embodiments, machine learning models or algorithms to perform monocular depth prediction, e.g., monocular depth prediction models, may be able to receive and process imaging data of inventory holders and generate depth maps of the inventory holders, compartments, and items contained therein. The monocular depth prediction models may generate depth maps of compartments and items contained therein based on monocular imaging data that includes translucent bands that partially occlude open faces of the compartments, as well as items therein.

In order to generate such depth maps from monocular imaging data that includes translucent, partially occlusive bands, the monocular depth prediction models may be trained using imaging data of inventory holders that include the partially occlusive bands, and also using depth data of inventory holders without the partially occlusive bands. By training the monocular depth prediction models in this manner, the models may be trained to effectively ignore or disregard the translucent, partially occlusive bands and generate accurate, reliable depth maps of inventory holders, including individual compartments and items contained therein.

In further example embodiments, the depth maps of inventory holders generated using the monocular depth prediction models may be utilized by various occupancy correction models or algorithms to improve determination and utilization of available storage space within compartments of inventory holders. For example, the various occupancy correction models may improve the determination of available storage space by performing perspective correction, depth-painted or depth-based occupancy correction, and/or orthographic projection with respect to items stored within compartments. In this manner, the determined depth maps may be leveraged to improve the determination and utilization of available storage space, thereby enabling reliable and efficient automated item stow/storage operations.

In additional example embodiments, additional machine learning models or algorithms to perform translucent occlusion inpainting, e.g., translucent occlusion inpainting models, may be able to receive and process imaging data of inventory holders that include the translucent, partially occlusive bands and generate imaging data of the inventory holders, compartments, and items contained therein without the translucent, partially occlusive bands. The translucent occlusion inpainting models may generate imaging data of compartments and items contained therein based on imaging data that includes translucent bands that partially occlude open faces of the compartments, as well as items therein.

In order to generate such imaging data without translucent bands from imaging data that includes translucent, partially occlusive bands, the translucent occlusion inpainting models may be trained using imaging data of inventory holders that include the partially occlusive bands, and also using imaging data of inventory holders without the partially occlusive bands. By training the translucent occlusion inpainting models in this manner, the models may be trained to effectively remove or erase the translucent, partially occlusive bands and generate accurate, reliable imaging data of inventory holders, including individual compartments and items contained therein.

In some example embodiments, the resultant imaging data, e.g., inpainted imaging data, from such translucent occlusion inpainting models may be used as inputs to the monocular depth prediction models described herein, in which such monocular depth prediction models may be configured or trained to process imaging data without the translucent, partially occlusive bands in order to generate depth maps of compartments and items therein. Further, the inpainted imaging data from such translucent occlusion inpainting models may also be used as inputs to various occupancy mask generation systems or methods, e.g., to generate two-dimensional (2D) occupancy masks, which 2D occupancy masks may be utilized as inputs to the various occupancy correction models described herein.

Figure 1B:
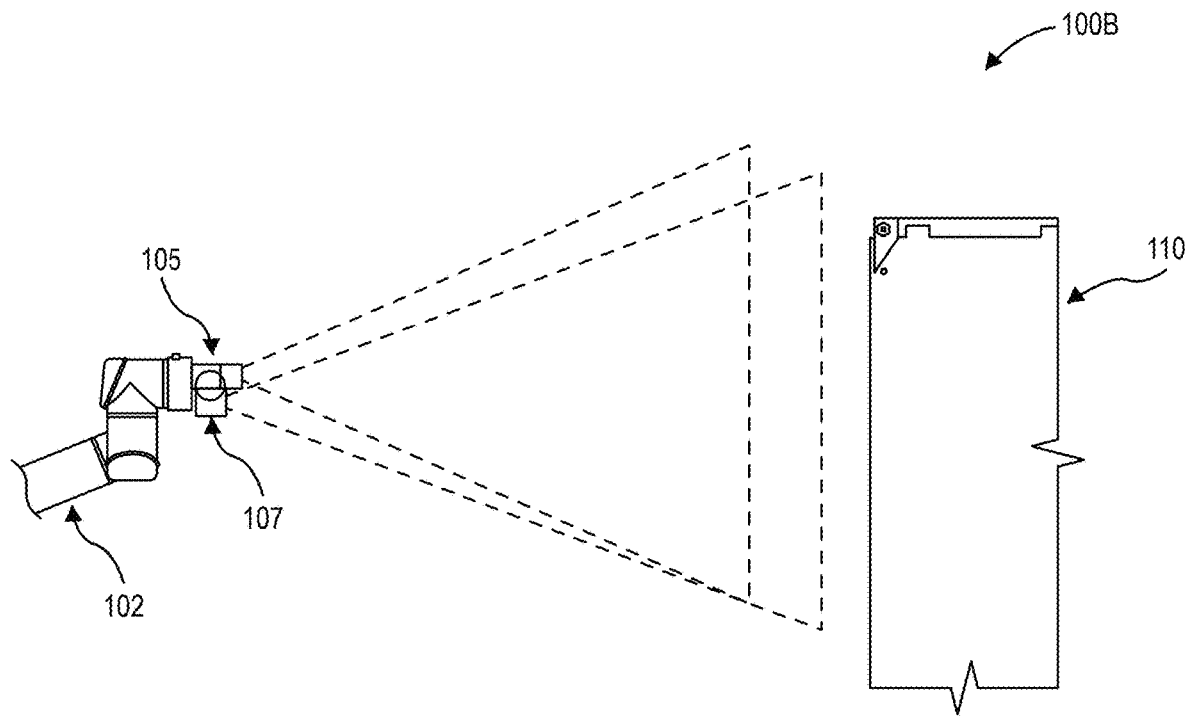

FIGS. 1A-1B are schematic diagrams 100A, 100B of an example data collection system to enable monocular depth prediction, in accordance with implementations of the present disclosure.

As shown in FIGS. 1A and 1B, an example data collection system may comprise a robotic arm 102, various sensors or sensor clusters 104, and one or more light panels 108. In addition, the data collection system may collect imaging data and depth data associated with various inventory holders 110 that may comprise one or more, e.g., a plurality of, compartments 112 having one or more items stored therein.

The inventory holders 110 may have various sizes, shapes, or dimensions, and may be formed of various materials, such as metals, plastics, wood, or others. The compartments 112 of various inventory holders 110 may have various different shapes, sizes, widths, heights, depths, or other dimensions. In addition, the compartments 112 may be formed of various materials, such as metals, plastics, wood, fabrics, or others. In some example embodiments described herein, the compartments 112 may be formed of fabrics that have been formed, assembled, sewn, or otherwise configured to couple to a frame of the inventory holder 110. Each of the compartments 112 may be configured to receive or store one or more items, packages, or products of various shapes, sizes, or dimensions. The various types of items may include books, electronics, clothing, housewares, automotive products, grocery items, and/or various other types of items.

In order to retain items within individual compartments 112 of the inventory holders 110, one or more translucent, flexible, and/or elastic bands 114 may be attached, coupled, or positioned over and/or around portions of the inventory holders 110 and compartments 112. The translucent bands 114 may be attached to portions, e.g., sides, of the inventory holders 110 via snap fasteners, button fasteners, hook and loop fasteners, or other types of removable attachments. Further, the translucent bands 114 may at least partially occlude open faces or sides of the compartments 112, in order to enable at least partial visual recognition of items within compartments 112, e.g., by human associates, while retaining items inside the compartments 112. For example, the translucent bands 114 may have one or more substantially clear or transparent portions, and one or more substantially translucent or partially occluding portions, e.g., stripes, bands, symbols, patterns, indicia, characters, or other translucent markings or patterns with various colors, shades, or textures.

In example embodiments, the robotic arm 102 of the data collection system may comprise a six-axis robotic arm, a robotic arm having one or more linkages, a robotic arm coupled to a gantry system, or various other types of robotic arms. The robotic arm 102 may be configured to move among a plurality of positions relative to the width and height of various inventory holders 110, in order to capture imaging data and depth data of substantially all compartments 112 of the inventory holders 110. Various inventory holders 110 may be moved or positioned in front of or relative to the robotic arm 102, e.g., via various manual or automated systems or methods, in order to capture imaging data and depth data of the inventory holders 110, compartments 112, and items therein.

Various sensors 104 may be coupled to an end of the robotic arm 102, and the robotic arm 102 may move the various sensors 104 among a plurality of positions in order to capture imaging data and depth data of substantially all compartments 112 of the inventory holders 110. The various sensors 104 may comprise one or more imaging devices, cameras, or sensors 105, and/or one or more depth sensors 107.

For example, the imaging devices 105 may comprise red-green-blue (RGB) imaging devices or sensors or other types of color imaging sensors, e.g., approximately 5 MP (megapixel) or higher MP RGB cameras. In some examples, only a single imaging device 105 may be coupled to the robotic arm 102. In other examples, two or more imaging devices 105 may be coupled to the robotic arm 102. The imaging devices 105 may capture imaging data, e.g., RGB imaging data, of a plurality of compartments 112 of inventory holders 110, and items contained therein.

In addition, the depth sensors 107 may comprise passive depth sensors or active depth sensors. In some examples, passive depth sensors 107 may comprise passive stereo depth sensors, e.g., two side-by-side imaging sensors, that capture imaging data, from which depth data may be determined or calculated. In further examples, the passive stereo depth sensors 107 may comprise at least two of the imaging devices 105. In other examples, one or more active depth sensors 107 may comprise imaging sensors that emit and capture various structured light or patterns, e.g., approximately 1.3 MP, approximately 2.3 MP, or higher MP active depth sensors, from which depth data may be determined or calculated. In further examples, the one or more active depth sensors 107 may comprise distance, ranging, or other time of flight sensors to determine depth data.

Further, the imaging devices 105 and depth sensors 107 may have positions, orientations, fields of view, and other data capture attributes that are calibrated relative to each other, in order to capture imaging data and depth data that may be correlated with each other and processed together to determine depth data associated with compartments and items contained therein.

Moreover, the one or more light panels 108 may comprise one or more, e.g., four, light panels that are configured and positioned to illuminate substantially all compartments 112 of various inventory holders 110. For example, the light panels 108 may comprise four light emitting diode (LED) light panels that emit at least approximately 1000 lux of light having a color temperature of approximately 6500 Kelvin (K). The example values of 1000 lux and 6500 K of emitted light from the light panels 108 may enable capture of imaging data and/or depth data of at least portions of items within compartments 112 through the partial occlusion caused by the translucent bands 114 that are flexibly and movably positioned over openings of faces of the compartments 112. Various other values of lux and color temperature of the light panels 108 may be used to illuminate compartments 112 and items contained therein during capture of imaging data and depth data, e.g., depending on the particular material and/or translucency characteristics of the translucent bands 114.

In example embodiments, the data collection system described herein may be used to capture imaging data and depth data that may be used to train a machine learning model to perform monocular depth prediction for various inventory holders, compartments, and items contained therein. In order to collect the imaging data and depth data using the data collection system, the robotic arm 102 may move the various sensors 104 along a repeating pattern among a plurality of positions relative to compartments 112 of an inventory holder 110 while illuminated by the light panels 108. In some examples, the robotic arm 102 may perform a raster scan of a front face, e.g., associated with openings of the compartments 112, of the inventory holder 110, by moving across the width of the front face at various different heights of the front face. Various other movement patterns or sequences may be used to capture the imaging data and depth data. In various examples, the movement of the robotic arm 102 may be continuous, smooth, discontinuous, and/or incremental.

During movement of the robotic arm 102, the various sensors 104 may be instructed or actuated to capture imaging data and/or depth data, e.g., approximately 100 captures of imaging or depth data with a robotic arm movement distance of about 10 cm between sequential captures and a precision of about 1 mm for an entire front face of an inventory holder 110. Various other examples may include other numbers or sequences of data captures and associated distances of robotic arm movement between sequential captures, and/or other values, amounts, or ranges of data capture precision for an entire front face of an inventory holder.

In some examples, the robotic arm 102 may perform multiple scans or passes of the front face of an inventory holder 110, in order to capture various imaging data and/or depth data of compartments 112 and items therein with each scan or pass. For example, in a first pass, imaging data of compartments 112 and items therein may be captured with translucent bands 114 positioned over openings of the compartments 112 and at least partially occluding compartments 112 and items therein. In a second pass, imaging data of compartments 112 and items therein may be captured without any translucent bands 114 positioned over openings of the compartments 112. In a third pass, depth data of compartments 112 and items therein may be captured without any translucent bands 114 positioned over openings of the compartments 112. In addition, the various scans or passes by the robotic arm 102 and various sensors 104 may be performed in any order, and more or fewer scans or passes to capture imaging and/or depth data may be performed. Further, various scans or passes by the robotic arm 102 and various sensors 104 may be combined in some examples, e.g., substantially simultaneous capture of imaging data and depth data of inventory holders without translucent bands 114.

Generally, the imaging data captured with translucent bands 114 at least partially occluding the compartments 112 and items therein, and the depth data captured without any translucent bands 114 may be used as training data for the monocular depth prediction machine learning models described herein. Further details of an example training process for monocular depth prediction machine learning models are described herein at least with respect to FIG. 3. As further described herein, the monocular depth prediction machine learning models may be trained to substantially ignore or disregard the translucent bands 114 within imaging data, and reliably and efficiently generate depth maps for various inventory holders based on imaging data that includes the translucent bands 114.

In some examples, the imaging data captured without any translucent bands 114 may be used in an intermediate processing step to determine and correct any movement or shifting of items within compartments 112, e.g., because the manual or automated removal of the translucent bands 114 may disrupt or move items. Thus, in scenarios in which the depth data without any translucent bands 114 is captured after removal of the translucent bands 114, the imaging data captured with translucent bands 114 may be corrected or adjusted based on any shifts or movements of items detected within the imaging data that is captured after removal of the translucent bands 114, in order to ensure alignment of item detection between the imaging data with translucent bands 114 and depth data without translucent bands 114.

In example embodiments, the data collection system described herein may be used to capture imaging data and depth data that may be used to train a machine learning model to perform monocular depth prediction for various inventory holders, compartments, and items contained therein. In addition, the data collection system may enable capture of imaging and/or depth data from various viewpoints or perspectives, e.g., viewpoint variance, with respect to individual compartments and items contained therein, which may improve or increase the robustness of machine learning models trained using such data. Further, the data collection system may capture a substantially large amount of data for various inventory holders in a relatively short period of time, which may increase the speed and/or efficiency of training machine learning models, and may also improve or increase the robustness of machine learning models trained using such data.

Figure 2:
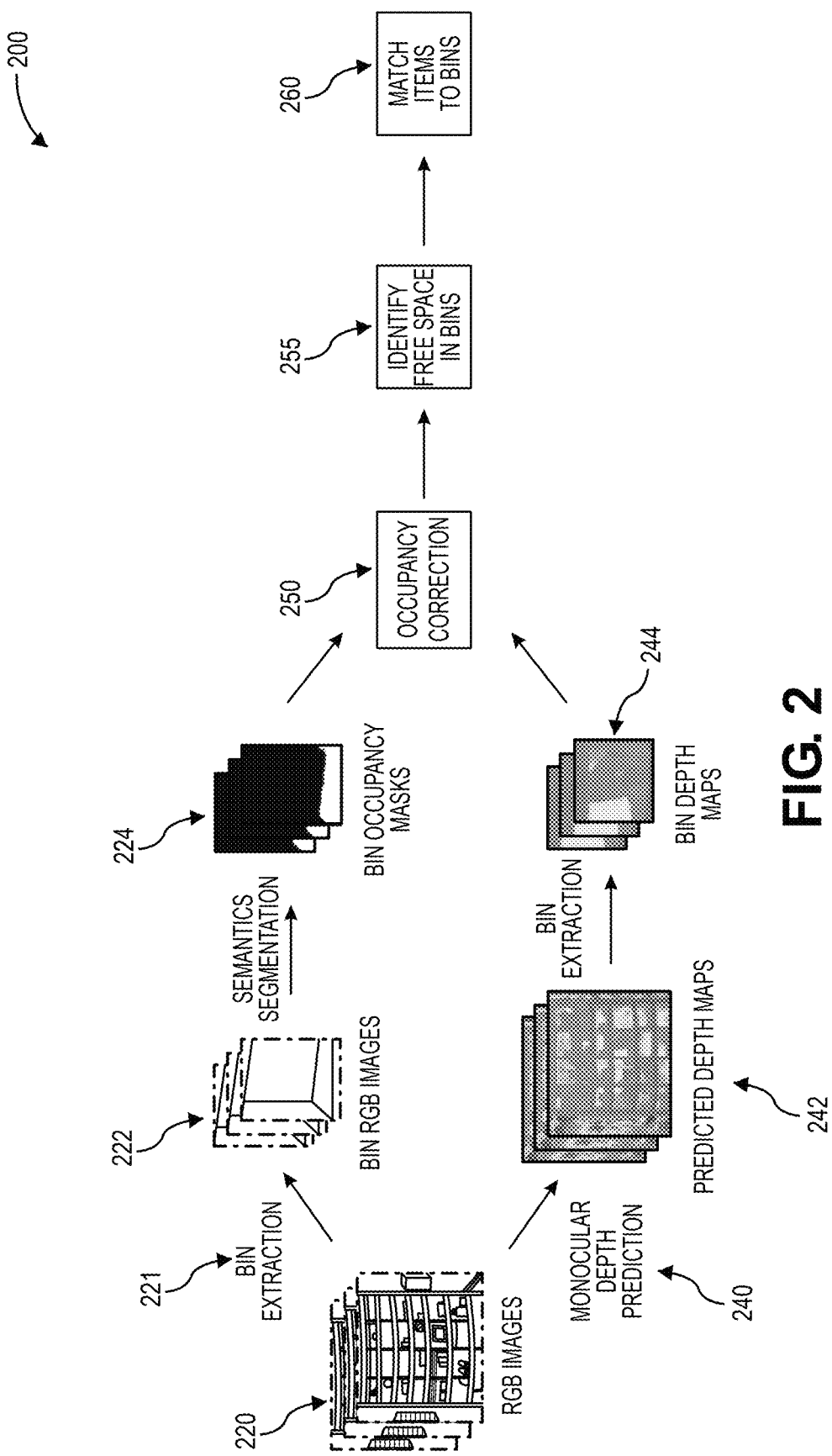
FIG. 2 is a schematic flow diagram illustrating example data collection, monocular depth prediction, and occupancy correction processes, in accordance with implementations of the present disclosure.

FIG. 2 is a schematic flow diagram 200 illustrating example data collection, monocular depth prediction, and occupancy correction processes, in accordance with implementations of the present disclosure.

As shown in FIG. 2, an example flow diagram of data collection, monocular depth prediction, and occupancy correction processes are illustrated. Using a data collection system that may be similar to that described herein with respect to FIG. 1, imaging data 220 including one or more RGB images of compartments and items contained in an inventory holder may be captured. Generally, the imaging data 220 may include representations of the compartments and items with translucent bands that at least partially occlude the openings of the compartments and items therein. In additional examples, the imaging data 220 may also include corresponding representations of the compartments and items without any translucent bands.

The imaging data 220 may be processed by at least two parallel or separate paths, as shown in FIG. 2. For example, the imaging data 220 may be processed using various bin or compartment extraction methods or processes 221 to generate individual bin or compartment images 222, e.g., bin RGB images. Such compartment extraction processes 221 may separate or extract individual compartment images 222 using various computer vision or other image processing algorithms or techniques.

Then, the individual compartment images 222 may be processed using various segmentation methods or processes, e.g., semantics segmentation, to generate individual bin or compartment occupancy masks 224, e.g., bin occupancy masks. The individual compartment occupancy masks 224 may generally comprise two-dimensional (2D) occupancy masks that indicate presence or absence, e.g., occupancy or non-occupancy, of items within portions of the individual compartments. As shown in the examples herein, bright or light portions of the occupancy masks may generally indicate presence of portions of one or more items within a compartment, and dark or filled portions of the occupancy masks may generally indicate absence of any portions of items within the compartment. Various segmentation methods, algorithms, or techniques may be used to generate individual compartment occupancy masks 224.

Generally, the processing steps to generate individual compartment images 222 and individual compartment occupancy masks 224 may receive and process imaging data 220 that includes representations of the compartments and items without any translucent bands. However, in some example embodiments, the imaging data 220 that includes representations of the compartments and items with translucent bands that at least partially occlude the openings of the compartments and items therein may be used to generate individual compartment images 222 and individual compartment occupancy masks 224.

Moreover, the imaging data 220 may be processed using monocular depth prediction machine learning models 240, e.g., monocular depth prediction models, to generate depth maps 242 associated with the compartments and items therein, e.g., predicted depth maps. In example embodiments, the monocular depth prediction models 240 may have been trained to receive and process imaging data 220 that includes representations of the compartments and items with translucent bands that at least partially occlude the openings of the compartments and items therein, and to generate depth maps 242 by substantially ignoring or disregarding the translucent bands represented in the imaging data 220. Further details of an example training process for monocular depth prediction machine learning models are described herein at least with respect to FIG. 3.

Then, the depth maps 242 associated with multiple compartments and items therein may be processed using various bin or compartment extraction methods or processes to generate individual bin or compartment depth maps 244, e.g., bin depth maps. Such compartment extraction processes may separate or extract individual compartment depth maps 244 using various computer vision or other image processing algorithms or techniques. In some examples, attributes of the extracted individual compartment images 222, e.g., sizes, shapes, dimensions, locations, or other attributes, may be utilized to facilitate extraction of corresponding individual compartment depth maps 244 associated with the inventory holder.

In further example embodiments, the individual compartment occupancy masks 224 and the individual compartment depth maps 244 may be received and processed by various occupancy correction models 250. Generally, compartment occupancy masks 224 may be used to determine available storage space within individual compartments. However, as described herein, various errors may be associated with compartment occupancy masks 224 that are determined solely based on imaging data. As a result, the compartment depth maps 244 may be processed in combination with the compartment occupancy masks 224 to improve the determination of available storage space within individual compartments.

Various types of occupancy correction models 250 may be used, including perspective correction models, depth-based or depth-painted occupancy correction models, and/or orthographic projection models, as further described herein at least with respect to FIGS. 4A-7. The occupancy correction models 250 may generate corrected or improved compartment occupancy masks, based on combined processing of the compartment occupancy masks 224 and compartment depth maps 244, in order to improve the determination and consequent utilization of available storage space within individual compartments.

Then, based on the output of the occupancy correction models 250, free or available storage space within bins or compartments may be determined or identified 255. The determination of available storage space may include information identifying a particular compartment of an inventory holder, as well as information related to size, shape, dimensions, locations, or other aspects of the available storage space within the particular compartment. Further, one or more items to be stowed/stored may be matched to the particular bin or compartment 260, e.g., based on information associated with various items to be stowed or stored within inventory holders. The determination of a match between one or more items and available storage space within a particular compartment of an inventory holder may include comparison or processing of various data or information associated with the available storage space and information associated with the one or more items, e.g., determining that the one or more items will fit within the size, shape, dimensions, locations, or other aspects of the available storage space.

Accordingly, for the example flow diagram of data collection, monocular depth prediction, and occupancy correction processes described herein, one or more data collection systems similar to the data collection system described at least with respect to FIGS. 1A and 1B may be used to capture imaging data of inventory holders, compartments, and items. In addition, monocular depth prediction models may receive and process the imaging data to generate predicted depth maps based on the imaging data that includes translucent bands at least partially occluding portions of compartments and items therein. Further, based on generated occupancy masks and depth maps for individual compartments, determination of available storage space within compartments may be improved using various occupancy correction models. In this manner, item stow/storage processes and methods, including automated item stow/storage processes, may be performed with improved reliability and efficiency.

Figure 3:
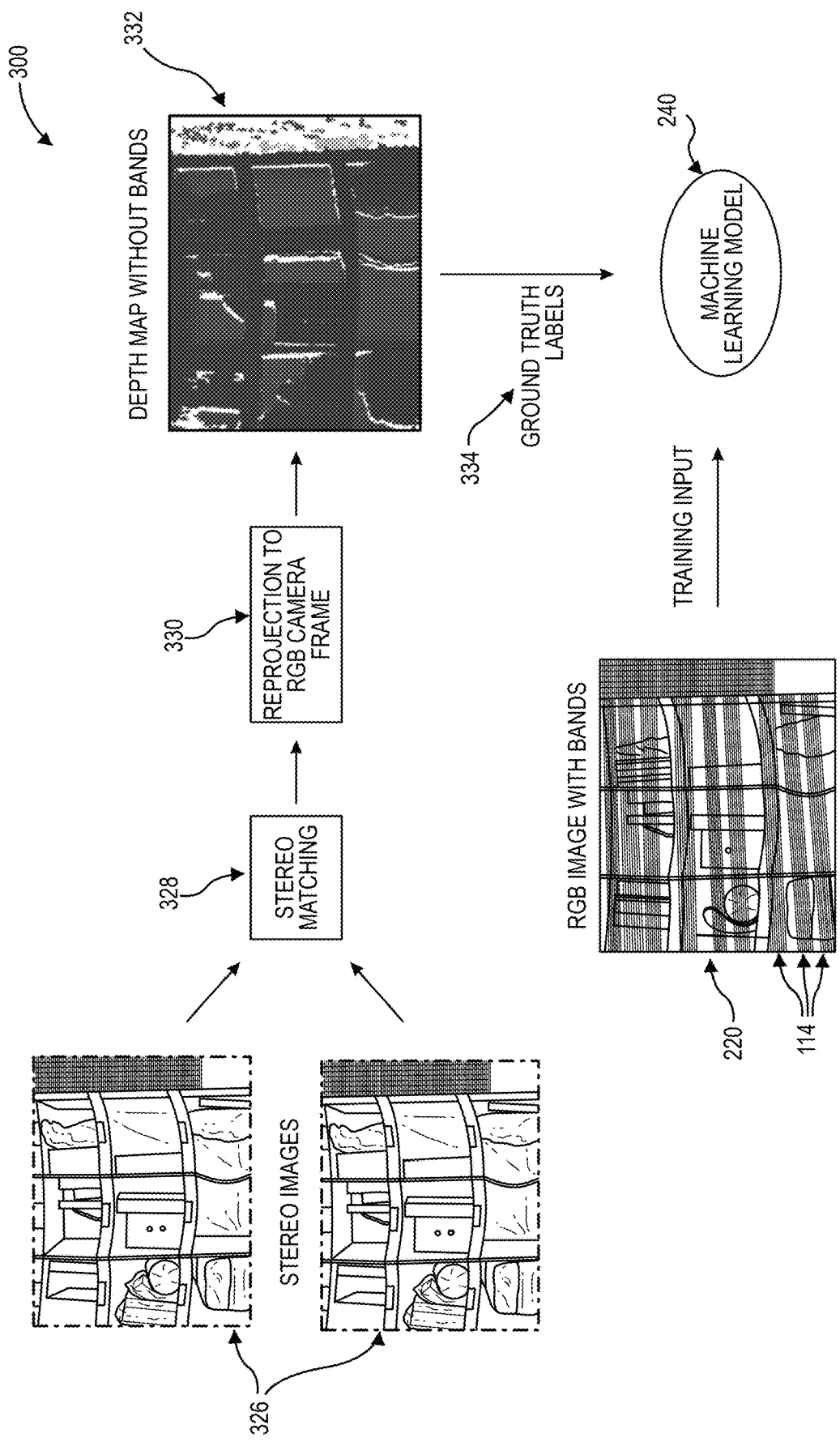
FIG. 3 is a schematic flow diagram illustrating an example training process for a monocular depth prediction machine learning model, in accordance with implementations of the present disclosure.

FIG. 3 is a schematic flow diagram 300 illustrating an example training process for a monocular depth prediction machine learning model, in accordance with implementations of the present disclosure.

An example monocular depth prediction machine learning model, e.g., a monocular depth prediction model, may comprise various types of convolutional neural networks, machine learning models or algorithms, or other types of neural networks or machine learning models. In example embodiments, the monocular depth prediction model may comprise a convolutional neural network having L1 regression loss.

As shown in FIG. 3, an example training process for a monocular depth prediction model may comprise imaging data 220, e.g., RGB images with bands, that are provided as training inputs to the monocular depth prediction model 240. As described herein, the imaging data 220 may include representations of compartments and items of inventory holders with translucent bands 114 that at least partially occlude the openings of the compartments and items therein. Further, the imaging data 220 may be captured by one or more imaging devices 105 of the data collection system described at least with respect to FIGS. 1A and 1B.

In addition, the monocular depth prediction model 240 may receive additional training inputs, e.g., target training inputs, of ground truth depth labels 334 associated with compartments and items of the inventory holders. In example embodiments, the various sensors 104 of the data collection system may comprise one or more active depth sensors 107 configured to capture stereo imaging and/or depth data 326 of compartments and items of inventory holders without any translucent bands during scanning of the robotic arm 102. In other example embodiments, the various sensors 104 of the data collection system may comprise two or more passive stereo cameras or imaging devices 105 configured to capture stereo imaging and/or depth data 326 at substantially the same times during scanning of the robotic arm 102.

The stereo imaging and/or depth data 326 captured by the active or passive sensors may be processed by various image processing methods or techniques to perform stereo matching 328 of imaging data from the active or passive sensors. Then, various image processing methods or techniques may reproject the imaging and/or depth data to a position and/or orientation of the imaging device that captured the imaging data 220, e.g., reprojection to the RGB camera frame 330. Then, based on the stereo matching 328 and reprojecting 330 of the stereo imaging and/or depth data, a depth map 332 of the compartments and items without any translucent bands may be generated by various data processing methods or techniques. Further, the depth map 332 from the active or passive sensors may be processed by various data processing methods to generate the ground truth depth labels 334 as additional training inputs for the monocular depth prediction model 240.

As a result, the monocular depth prediction model 240 may receive imaging data 220 that includes translucent bands 114 as training inputs, and may receive ground truth depth labels 334 as additional training inputs, e.g., target training inputs. Using the training inputs, the monocular depth prediction model 240 may be trained to receive and process the imaging data 220 with translucent bands 114, and to generate a predicted depth map as output that substantially coincides or matches with the ground truth depth labels 334.

In this manner, during operation or use of a trained monocular depth prediction model 240, the monocular depth prediction model 240 may substantially ignore or disregard translucent bands 114 that may be present within imaging data 220, and further generate accurate depth maps of compartments and items of inventory holders based on such imaging data 220, without any additional inputs related to depth data. Then, as further described herein at least with respect to FIGS. 4A-7, the predicted depth maps may be utilized by various occupancy correction models to improve the determination of available storage space within compartments of inventory holders.

FIGS. 4A-4B are schematic diagrams 400A, 400B of an example occupancy correction process using perspective correction based on monocular depth prediction, in accordance with implementations of the present disclosure.

As shown in FIGS. 4A and 4B, an example occupancy correction process or model may receive and process compartment occupancy masks and compartment depth maps, and perform perspective correction to generate improved compartment occupancy masks. The compartment occupancy masks may comprise 2D occupancy masks, similar to the compartment occupancy masks 224 described with respect to FIG. 2, and the compartment depth maps may comprise compartment depth maps 244 generated using monocular depth prediction models, similar to those described at least with respect to FIGS. 2 and 3.

For example, as shown in FIG. 4A, an imaging device 405 may capture imaging data of at least a portion of an inventory holder including a compartment 412 and an item contained therein. The left side of FIG. 4A may illustrate a top-down view of the imaging device 405 and compartment 412, with an x-axis extending along a distance between the imaging device 405 and the compartment 412 as well as a depth of the compartment 412, a y-axis extending along a width of the compartment 412, and a z-axis extending along a height of the compartment 412 and in and out of the page of FIG. 4A.

In the example of FIG. 4A, there may be an offset between an optical axis of the imaging device 405 and the item within the compartment 412. For example, the imaging device 405 may be positioned at a first position along the y-axis relative to a width of the compartment 412 and item therein, and the item within the compartment 412 may be at a different position along the y-axis. Because of the offset between an optical axis of the imaging device 405 and portions of the item within the compartment 412, e.g., a current perspective of the imaging device 405, a compartment occupancy mask 424A that is generated based on the imaging data captured by the imaging device 405 may include errors associated with the current perspective.

In this regard, the compartment occupancy mask 424A may illustrate a side view of the compartment, e.g., looking into an opening of the compartment associated with a face of the inventory holder. For example, the compartment occupancy mask 424A may present a view of the compartment 412, when viewed from a left side and along the x-axis as shown in the left side of FIG. 4A. At the current perspective of the imaging device 405, a point, edge, or surface 451A of the item may be identified as a limit of available storage space 425A within the compartment 412. However, as illustrated in the top-down view at the left side of FIG. 4A, the point, edge, or surface 451A of the item may not actually correspond to a portion of the item, but may instead comprise a portion of the item at a greater depth that appears to be present at the point, edge, or surface 451A due to the current perspective of the imaging device 405.

In order to correct such errors, perspective correction may be performed for portions of the compartment occupancy mask 424A. For example, one or more occupied points, e.g., hashed portions, of the compartment occupancy mask 424A that are identified as limits of available storage space 425A may be identified, and depth data associated with the one or more occupied points may be identified from a corresponding compartment depth map, e.g., predicted using the monocular depth prediction models. For example, one or more points proximate the point, edge, or surface 451A of the item that are indicated as occupied points within compartment occupancy mask 424A may be identified, and depth data for such occupied points may be identified with reference to a compartment depth map.

In the example of FIG. 4A, upon querying depth data from the compartment depth map for one or more points proximate the point, edge, or surface 451A of the item that are indicated as occupied points within compartment occupancy mask 424A, it may be determined that the point, edge, or surface 451A of the item is actually positioned at a greater depth within compartment 412 at point, edge, or surface 452A of the item. Depth data from the compartment depth map may be queried for one or more occupied points proximate the point, edge, or surface 451A of the item to determine an actual depth of the point, edge, or surface 452A of the item. Then, based on data or information related to a current perspective, e.g., an offset along the y-axis between the optical axis and the portion of the item, as well as a distance along the x-axis between the imaging device 405 and the compartment 412 with the item therein, an actual position, e.g., at least along the y-axis, of the point, edge, or surface 452A of the item at the actual depth may be determined.

Based on the determined actual position and actual depth of the point, edge, or surface 452A of the item within the compartment 412, a corrected compartment occupancy mask 450A may be generated. The corrected compartment occupancy mask 450A may indicate the point, edge, or surface 452A of the item that is now identified as a limit of available storage space 455A within the compartment 412. In the example of FIG. 4A, the corrected determination of available storage space 455A may be increased relative to the original determination of available storage space 425A.

Thus, by utilizing compartment depth maps, e.g., generated using the monocular depth prediction models, in combination with compartment occupancy masks, perspective errors associated with compartment occupancy masks may be corrected to generate corrected compartment occupancy masks, thereby generating improved and more accurate determinations with respect to available storage space within compartments of inventory holders.

In addition, as shown in FIG. 4B, an imaging device 405 may capture imaging data of at least a portion of an inventory holder including a compartment 412 and an item contained therein. The left side of FIG. 4B may illustrate a top-down view of the imaging device 405 and compartment 412, with an x-axis extending along a distance between the imaging device 405 and the compartment 412 as well as a depth of the compartment 412, a y-axis extending along a width of the compartment 412, and a z-axis extending along a height of the compartment 412 and in and out of the page of FIG. 4B.

In the example of FIG. 4B, there may again be an offset between an optical axis of the imaging device 405 and the item within the compartment 412. For example, the imaging device 405 may be positioned at a first position along the y-axis relative to a width of the compartment 412 and item therein, and the item within the compartment 412 may be at a different position along the y-axis. Because of the offset between an optical axis of the imaging device 405 and portions of the item within the compartment 412, e.g., a current perspective of the imaging device 405, a compartment occupancy mask 424B that is generated based on the imaging data captured by the imaging device 405 may include errors associated with the current perspective.

In this regard, the compartment occupancy mask 424B may illustrate a side view of the compartment, e.g., looking into an opening of the compartment associated with a face of the inventory holder. For example, the compartment occupancy mask 424B may present a view of the compartment 412, when viewed from a left side and along the x-axis as shown in the left side of FIG. 4B. At the current perspective of the imaging device 405, a point, edge, or surface 451B of the item may be identified as a limit of available storage space 425B within the compartment 412. However, as illustrated in the top-down view at the left side of FIG. 4B, the point, edge, or surface 451B of the item may not actually correspond to a portion of the item, but may instead comprise a portion of the item at a greater depth that appears to be present at the point, edge, or surface 451B due to the current perspective of the imaging device 405.

In order to correct such errors, perspective correction may be performed for portions of the compartment occupancy mask 424B. For example, one or more occupied points, e.g., hashed portions, of the compartment occupancy mask 424B that are identified as limits of available storage space 425B may be identified, and depth data associated with the one or more occupied points may be identified from a corresponding compartment depth map, e.g., predicted using the monocular depth prediction models. For example, one or more points proximate the point, edge, or surface 451B of the item that are indicated as occupied points within compartment occupancy mask 424B may be identified, and depth data for such occupied points may be identified with reference to a compartment depth map.

In the example of FIG. 4B, upon querying depth data from the compartment depth map for one or more points proximate the point, edge, or surface 451B of the item that are indicated as occupied points within compartment occupancy mask 424B, it may be determined that the point, edge, or surface 451B of the item is actually positioned at a greater depth within compartment 412 at point, edge, or surface 452B of the item. Depth data from the compartment depth map may be queried for one or more occupied points proximate the point, edge, or surface 451B of the item to determine an actual depth of the point, edge, or surface 452B of the item. Then, based on data or information related to a current perspective, e.g., an offset along the y-axis between an optical axis and the portion of the item, as well as a distance along the x-axis between the imaging device 405 and the compartment 412 with the item therein, an actual position, e.g., at least along the y-axis, of the point, edge, or surface 452B of the item at the actual depth may be determined.

Based on the determined actual position and actual depth of the point, edge, or surface 452B of the item within the compartment 412, a corrected compartment occupancy mask 450B may be generated. The corrected compartment occupancy mask 450B may indicate the point, edge, or surface 452B of the item that is now identified as a limit of available storage space 455B within the compartment 412. In the example of FIG. 4B, the corrected determination of available storage space 455B may be decreased relative to the original determination of available storage space 425B.

Thus, by utilizing compartment depth maps, e.g., generated using the monocular depth prediction models, in combination with compartment occupancy masks, perspective errors associated with compartment occupancy masks may be corrected to generate corrected compartment occupancy masks, thereby generating improved and more accurate determinations with respect to available storage space within compartments of inventory holders.

Figure 5:
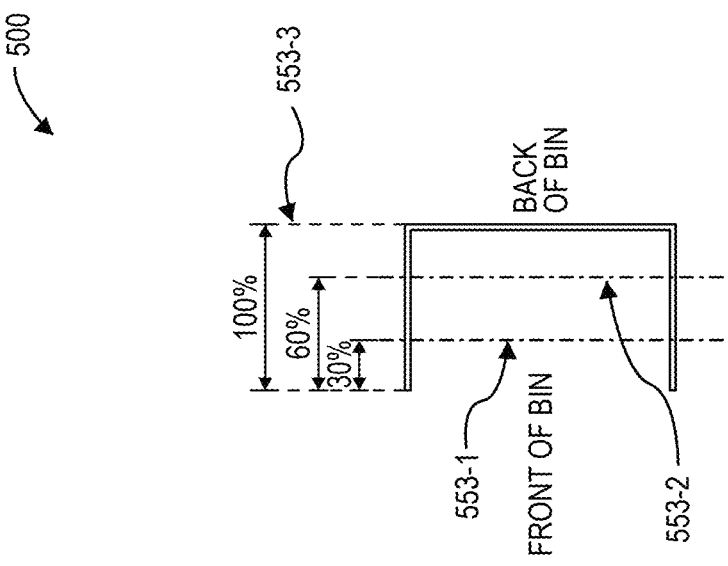
FIG. 5 is a schematic diagram of an example occupancy correction process using depth-painted occupancy based on monocular depth prediction, in accordance with implementations of the present disclosure.
Figure 5:
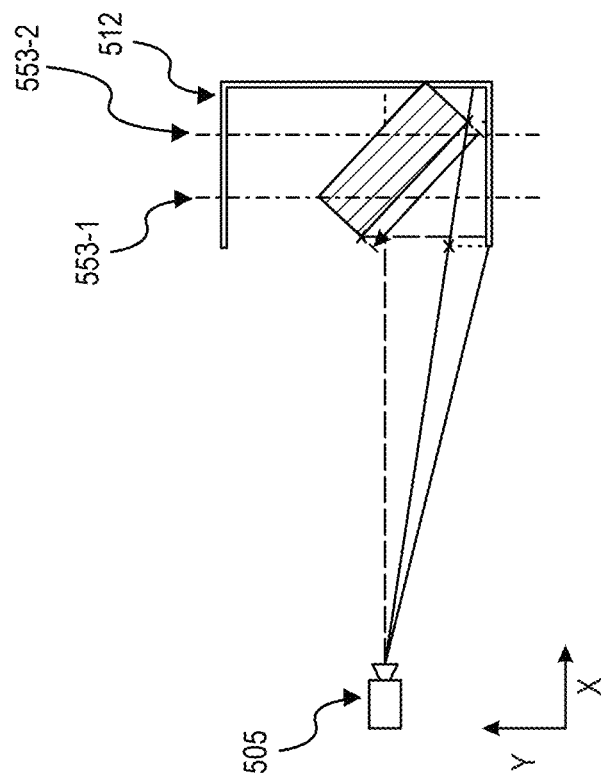
Figure 6A:
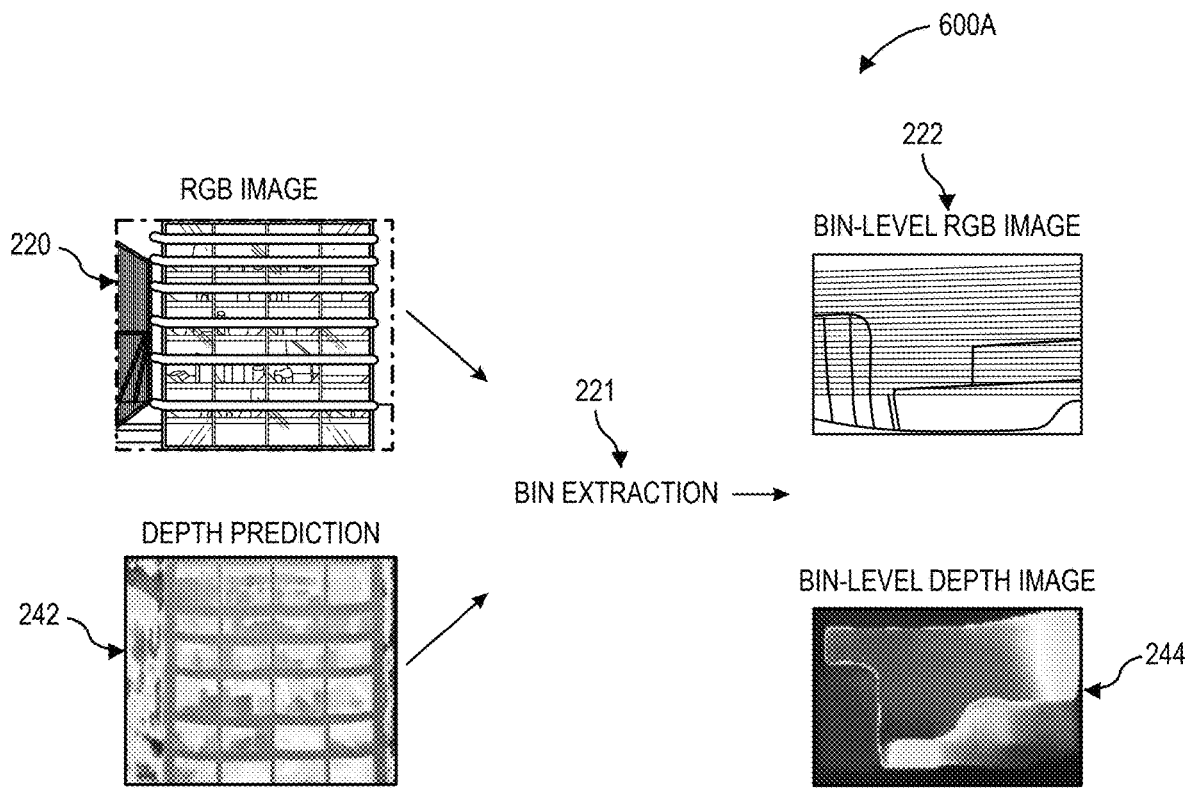
FIGS. 6A-6B are further schematic diagrams of an example occupancy correction process using depth-painted occupancy based on monocular depth prediction, in accordance with implementations of the present disclosure.
Figure 6B:
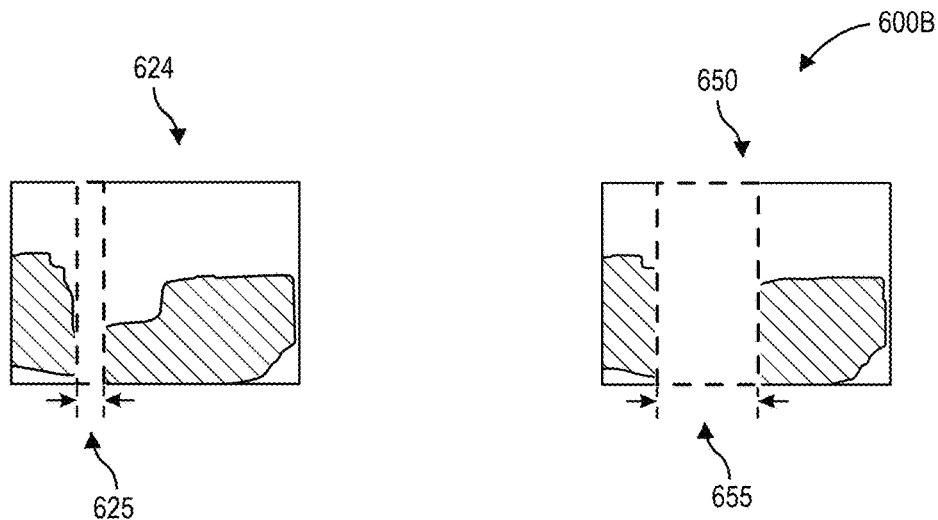

FIG. 5 is a schematic diagram 500 of an example occupancy correction process using depth-painted occupancy based on monocular depth prediction, in accordance with implementations of the present disclosure, and FIGS. 6A-6B are further schematic diagrams 600A, 600B of an example occupancy correction process using depth-painted occupancy based on monocular depth prediction, in accordance with implementations of the present disclosure.

As shown in FIGS. 5-6B, an example occupancy correction process or model may receive and process compartment occupancy masks and compartment depth maps, and perform depth-painted or depth-based occupancy correction to generate improved compartment occupancy masks. The compartment occupancy masks may comprise 2D occupancy masks, similar to the compartment occupancy masks 224 described with respect to FIG. 2, and the compartment depth maps may comprise compartment depth maps 244 generated using monocular depth prediction models, similar to those described at least with respect to FIGS. 2 and 3.

For example, as shown in FIG. 5, an imaging device 505 may capture imaging data of at least a portion of an inventory holder including a compartment 512 and an item contained therein. The left side of FIG. 5 may illustrate a top-down view of the imaging device 505 and compartment 512, with an x-axis extending along a distance between the imaging device 505 and the compartment 512 as well as a depth of the compartment 512, a y-axis extending along a width of the compartment 512, and a z-axis extending along a height of the compartment 512 and in and out of the page of FIG. 5. The right side of FIG. 5 may also illustrate a top-down view of the compartment, in the same relative orientation as that shown at the left side of FIG. 5.

In example embodiments, determinations of available storage space within compartments 512 of inventory holders may be inaccurate or unreliable because items may move substantially freely within the compartments 512. In particular, items may rotate within the compartments 512, which may lead to inaccurate determinations that less or reduced storage space is available within the compartments. However, if the items are rotated within the compartments 512 such that they are substantially aligned or squared with side and/or rear surfaces of the compartments 512, determinations of the available storage space within compartments 512 may be more accurately made, in order to stow/store items in the compartment 512.

Thus, the depth-painted or depth-based occupancy correction models and processes described herein may correct or estimate determinations of available storage space to account for rotated or misaligned items within compartments. In this regard, various portions of occupancy masks corresponding to portions of items within compartments may be removed or ignored based on depth data associated with different portions of the items. As shown in FIG. 5, one or more depth thresholds 553-1, 553-2, 553-3 may be determined or selected, and portions of occupancy masks that correspond to portions of items that are at depths greater than a selected depth threshold 553 may be removed or ignored from the compartment occupancy masks to generate corrected compartment occupancy masks. In various examples, the depth thresholds may correspond to an approximately 30% depth threshold 533-1, an approximately 60% depth threshold 533-2, an approximately 100% depth threshold 533-3, or various other depth thresholds.

As shown in FIG. 6A, imaging data 220 of one or more compartments of an inventory holder may be captured, and predicted depth maps 242 of the one or more compartments of the inventory holder may be generated, e.g., using the monocular depth prediction models described herein. Further, individual compartments may be extracted or separated 221 from the imaging data 220 and predicted depth maps 242 using various imaging data or other data processing methods. Then, individual compartment images 222 and corresponding individual compartment depth maps 244 may be generated by the bin or compartment extraction processes 221. The processes and steps described in FIG. 6A are substantially similar to, and may include any and all of the features of, the corresponding processes and steps described herein at least with respect to FIG. 2.

As shown at the left side of FIG. 6B, a compartment occupancy mask 624 may illustrate a side view of the compartment, e.g., looking into an opening of the compartment associated with a face of the inventory holder. For example, the compartment occupancy mask 624 may present a view of the compartment 512, when viewed from a left side and along the x-axis as shown in the left side of FIG. 5. The compartment occupancy mask 624 may be generated based on an individual compartment image 222, as described with respect to FIG. 2. Further, available storage space 625 may be identified based on unoccupied portions of the compartment occupancy mask 624. However, the identified available storage space 625 may be inaccurate or unreliable in situations in which one or more items have rotated within the compartment 512 and appear to be larger and occupy more space than actually required.

In order to correct such errors, depth-painted or depth-based occupancy correction may be performed for portions of the compartment occupancy mask 624. For example, a plurality of points of the compartment occupancy mask 624 that are indicated as occupied by portions of an item, e.g., hashed portions, may be identified, and depth data associated with the occupied points may be identified from a corresponding compartment depth map, e.g., predicted using the monocular depth prediction models. For example, all or substantially all points that are indicated as occupied points within the compartment occupancy mask 624 may be identified, and depth data for such occupied points may be identified with reference to a compartment depth map.

Upon querying depth data from the compartment depth map for all or substantially all points that are indicated as occupied points within the compartment occupancy mask 624, the depth data for each of the points may be compared with one or more selected depth thresholds, as described with respect to FIG. 5. Then, as shown at the right side of FIG. 6B, those points having associated depth data that is less than a selected depth threshold may be maintained as part of a corrected compartment occupancy mask 650, and those points having associated depth data that is greater than the selected depth threshold may be removed or erased from the corrected compartment occupancy mask 650.

Based on the determined depths of occupied points and the comparison with selected depth thresholds, a corrected compartment occupancy mask 650 may be generated that includes only those points at a depth less than the selected depth threshold. As a result, the corrected compartment occupancy mask 650 may comprise an approximation or estimation of sizes of one or more items in the compartment if such items are not rotated at angles relative to side or rear faces of the compartment 512. Further, updated or corrected available storage space 655 may be identified based on unoccupied portions of the corrected compartment occupancy mask 650. In the example at the right side of FIG. 6B, the corrected determination of available storage space 655 may be increased relative to the original determination of available storage space 625.

In this manner, points having greater depth data may be assumed to be rotated portions of items within the compartment 512, which may be removed from the determinations related to available storage space based on the assumption that such rotated items may be moved or reoriented as part of stowing/storing additional items within the compartment 512.

Thus, by utilizing compartment depth maps, e.g., generated using the monocular depth prediction models, in combination with compartment occupancy masks, occupied points having greater depth data than a selected depth threshold may be assumed to be rotated portions of items within the compartment, and such points may be removed from compartment occupancy masks to generate corrected or estimated compartment occupancy masks, thereby generating improved and more accurate determinations with respect to available storage space within compartments of inventory holders.

Figure 7:
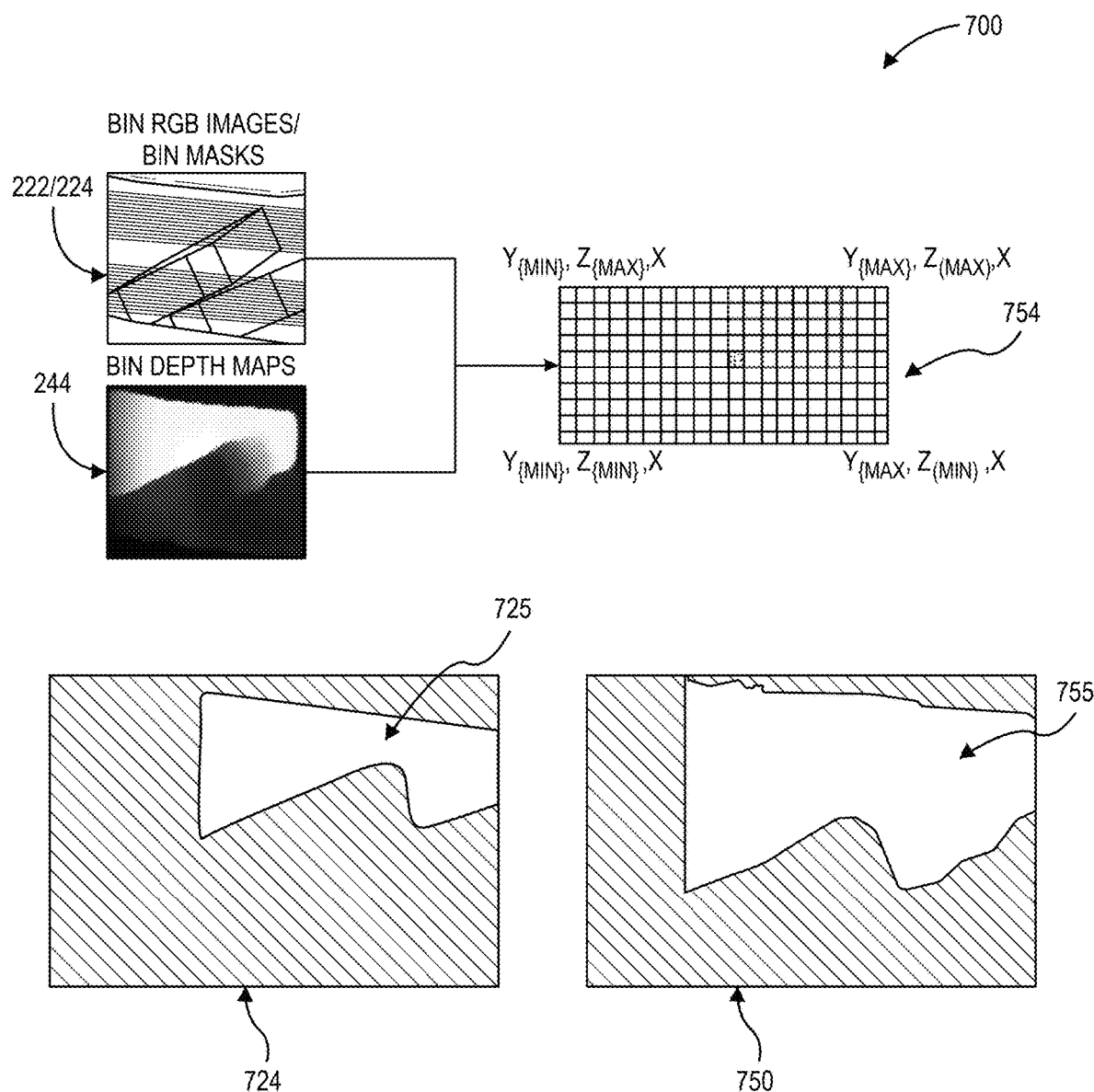
FIG. 7 is a schematic diagram of an example occupancy correction process using orthographic projection based on monocular depth prediction, in accordance with implementations of the present disclosure.

FIG. 7 is a schematic diagram 700 of an example occupancy correction process using orthographic projection based on monocular depth prediction, in accordance with implementations of the present disclosure.

As shown in FIG. 7, an example occupancy correction process or model may receive and process compartment occupancy masks and compartment depth maps, and perform orthographic projection to generate improved compartment occupancy masks. The compartment occupancy masks may comprise 2D occupancy masks, similar to the compartment occupancy masks 224 described with respect to FIG. 2, and the compartment depth maps may comprise compartment depth maps 244 generated using monocular depth prediction models, similar to those described at least with respect to FIGS. 2 and 3.

In the example of FIG. 7, there may be various offsets between an optical axis of an imaging device and one or more items within a compartment. The various offsets may be associated with or extend along the x-axis, y-axis, and/or z-axis, which may be oriented similar to the reference frames described with respect to FIGS. 4A-6B. For example, the imaging device may be positioned at a particular position having x, y, z coordinates relative to various x, y, z coordinates of portions of the compartment and items therein. Because of the various offsets along one or more of the x-, y-, and z-axes between an optical axis of the imaging device and portions of one or more items within the compartment, e.g., a current perspective of the imaging device, a compartment occupancy mask that is generated based on the imaging data captured by the imaging device may include various errors associated with the current perspective along one or more of the x-, y-, and z-axes.

For example, as shown at a lower left side of FIG. 7, a compartment occupancy mask 724 may be generated based on imaging data from an imaging device with various offset errors based on a current perspective, in which occupied portions are indicated by hashed portions. Because of the current perspective associated with the imaging data, the compartment occupancy mask 724 may indicate only limited available storage space 725 within the compartment and around portions of items contained therein.

In order to correct such errors associated with a current perspective of the imaging device, an orthographic projection 754 of the compartment and items therein may be generated. For example, using the compartment images 222, compartment occupancy masks 224, and/or compartment depth maps 244, x-, y-, and z-coordinates of individual points of the compartment and items therein may be calculated to generate an orthographic projection 754 of all points of the compartment and items therein that removes or eliminates substantially all perspective errors. The y- and z-coordinates, e.g., defining a plane associated with an opening of the compartment, may be determined based on the compartment images 222 and/or compartment occupancy masks 224. In addition, the x-coordinates, e.g., depth data into and out of the compartment, may be determined based on depth data identified from a corresponding compartment depth map, e.g., predicted using the monocular depth prediction models. In some examples, the orthographic projection 754 may be generated with a particular or selected resolution, which may be larger or coarser than an actual resolution associated with the imaging data or compartment images. In this manner, an orthographic projection 754 for substantially all portions of a compartment and items therein may be generated that removes substantially all perspective errors.

Based on the generated orthographic projection 754 of the compartment and items therein, a corrected compartment occupancy mask 750 may be generated in which occupied portions are indicated by hashed portions, as shown at a lower right side of FIG. 7. The corrected compartment occupancy mask 750 may be generated by processing the orthographic projection 754 using various segmentation, e.g., semantics segmentation, methods or techniques. Further, updated or corrected available storage space 755 may be identified based on unoccupied portions of the corrected compartment occupancy mask 750. In the example at the lower right side of FIG. 7, the corrected determination of available storage space 755 may be increased relative to the original determination of available storage space 725.

Thus, by utilizing compartment depth maps, e.g., generated using the monocular depth prediction models, in combination with compartment occupancy masks and/or compartment images, an orthographic projection may be generated that removes substantially all perspective errors associated with compartment occupancy masks to generate corrected compartment occupancy masks, thereby generating improved and more accurate determinations with respect to available storage space within compartments of inventory holders.

Although the orthographic projection of FIG. 7 is described using a reference frame that is similar to that described in FIGS. 4A-6B for consistency herein, the x-, y-, and z-axes may be labeled in different manners than that described herein. For example, the x- and y-coordinates may be used to define a plane associated with an opening of the compartment, and the z-coordinates may be used to define depth data into and out of the compartment. Various other reference frames may also be used to define individual points of orthographic projections.

Figure 8:
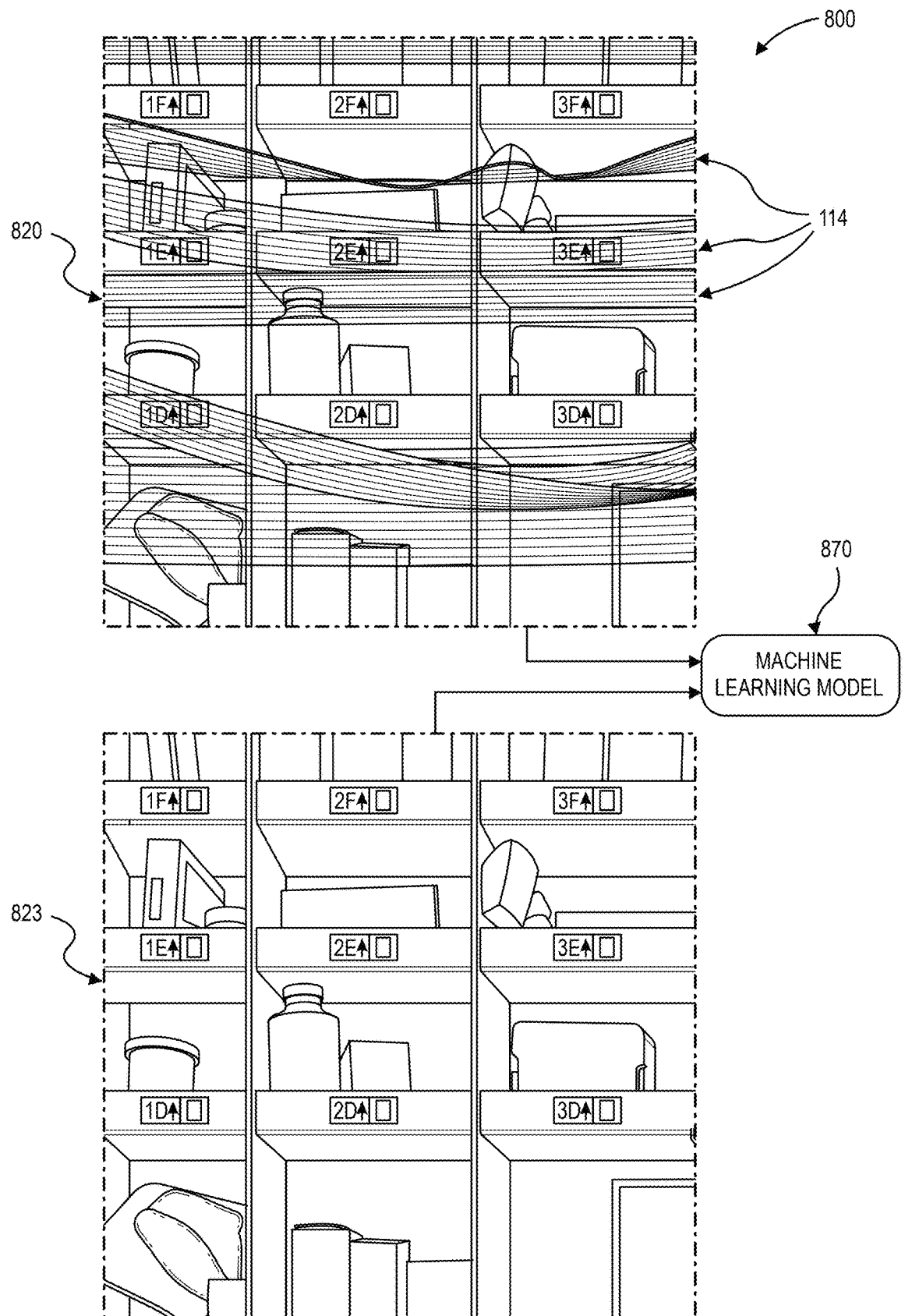
FIG. 8 is a schematic flow diagram illustrating an example training process for a translucent occlusion inpainting machine learning model, in accordance with implementations of the present disclosure.

FIG. 8 is a schematic flow diagram 800 illustrating an example training process for a translucent occlusion inpainting machine learning model, in accordance with implementations of the present disclosure.

An example translucent occlusion inpainting machine learning model, e.g., a translucent occlusion inpainting model, may comprise various types of convolutional neural networks, machine learning models or algorithms, or other types of neural networks or machine learning models. In example embodiments, the translucent occlusion inpainting model may comprise a convolutional neural network having L1 regression loss.

As shown in FIG. 8, an example training process for a translucent occlusion inpainting model may comprise imaging data 820, e.g., RGB images with bands, that are provided as training inputs to the translucent occlusion inpainting model 870. As described herein, the imaging data 820 may include representations of compartments and items of inventory holders with translucent bands 114 that at least partially occlude the openings of the compartments and items therein. Further, the imaging data 820 may be captured by one or more imaging devices 105 of the data collection system described at least with respect to FIGS. 1A and 1B.

In addition, the translucent occlusion inpainting model 870 may receive additional training inputs, e.g., target training inputs, of imaging data 823. The additional imaging data 823, e.g., RGB images without bands, may include representations of compartments and items of inventory holders without any translucent bands 114.

As a result, the translucent occlusion inpainting model 870 may receive imaging data 820 that includes translucent bands 114 as training inputs, and may receive additional imaging data 823 that does not include translucent bands 114 as additional training inputs, e.g., target training inputs. Using the training inputs, the translucent occlusion inpainting model 870 may be trained to receive and process the imaging data 820 with translucent bands 114, and to generate imaging data as output that substantially coincides or matches with the additional imaging data 823 without translucent bands 114.

In this manner, the translucent occlusion inpainting model 870 may be trained to substantially remove or erase translucent bands 114 that may be present within imaging data 820, and further to generate accurate imaging data of compartments and items of inventory holders without any translucent bands 114, e.g., to generate inpainted imaging data. Moreover, by generating inpainted imaging data based on imaging data that includes translucent bands, the additional data collection step of scanning and capturing imaging data of compartments and items therein without any translucent bands may be eliminated or skipped, e.g., for various processes that may utilize, require, or benefit from such imaging data without translucent bands.

The inpainted imaging data may be utilized by various of the monocular depth prediction models, occupancy correction models, or other processes described herein. For example, the inpainted imaging data may be used to train other example embodiments of monocular depth prediction models to generate depth maps of compartments and items therein based on imaging data that does not include translucent bands. In some examples, depth maps of compartments and items therein may be generated more reliably or accurately by utilizing inpainted imaging data instead of imaging data that includes translucent bands, in which the presence of translucent bands may adversely affect the depth prediction processes.

In addition, the inpainted imaging data may be used as input data to facilitate various bin or compartment extraction processes 221 to generate bin or compartment images 222, and/or various segmentation processes to generate bin or compartment occupancy masks 224. In some examples, compartment images 222 and/or compartment occupancy masks 224 may be generated more reliably or accurately by utilizing inpainted imaging data instead of imaging data that includes translucent bands, in which the presence of translucent bands may adversely affect the compartment extraction and/or segmentation processes.

Using the various systems, methods, processes, and/or models described herein, depth maps of compartments of inventory holders may be predicted or generated based on monocular imaging data, even in the presence of at least partially occlusive translucent bands. In addition, occupancy masks of compartments of inventory holders may be extracted and segmented based on various imaging data. Further, occupancy masks may be corrected or updated based on the predicted depth maps. As a result, available storage space within compartments of inventory holders may be more accurately and reliably determined, thereby potentially increasing the utilization of space and corresponding efficiency of various associated material handling systems and processes.

Figure 9:
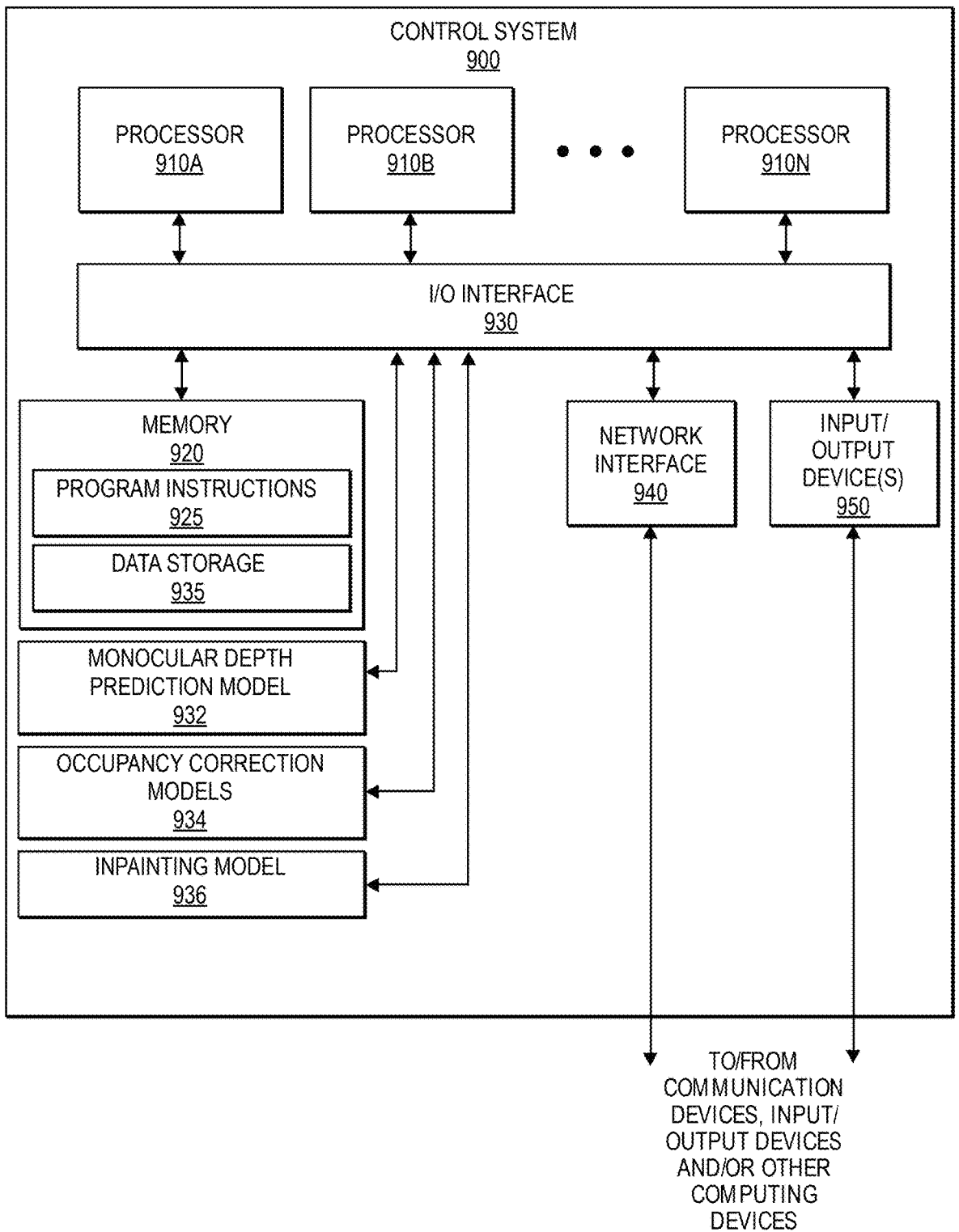
FIG. 9 is a block diagram illustrating various components of an example control system, in accordance with implementations of the present disclosure.

FIG. 9 is a block diagram illustrating various components of an example control system 900, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. In the illustrated implementation, a control system 900 includes one or more processors 910A, 910B through 910N, coupled to a non-transitory computer-readable storage medium 920 via an input/output (I/O) interface 930. The control system 900 further includes a network interface 940 coupled to the I/O interface 930, and one or more input/output devices 950. In some implementations, it is contemplated that a described implementation may be implemented using a single instance of the control system 900 while, in other implementations, multiple such systems or multiple nodes making up the control system 900 may be configured to host different portions or instances of the described implementations. For example, in one implementation, some data sources or services (e.g., related to portions of monocular depth prediction and occupancy correction systems, operations, or processes, etc.) may be implemented via one or more nodes of the control system 900 that are distinct from those nodes implementing other data sources or services (e.g., related to other portions of monocular depth prediction and occupancy correction systems, operations, or processes, etc.).

In various implementations, the control system 900 may be a uniprocessor system including one processor 910A, or a multiprocessor system including several processors 910A-910N (e.g., two, four, eight, or another suitable number). The processors 910A-910N may be any suitable processor capable of executing instructions. For example, in various implementations, the processors 910A-910N may be general-purpose or embedded processors implementing any of a variety of instruction set architectures (ISAs), such as the x86, PowerPC, SPARC, or MIPS ISAs, or any other suitable ISA. In multiprocessor systems, each of the processors 910A-910N may commonly, but not necessarily, implement the same ISA.

The non-transitory computer-readable storage medium 920 may be configured to store executable instructions and/or data accessible by the one or more processors 910A-910N. In various implementations, the non-transitory computer-readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 920 as program instructions 925 and data storage 935, respectively. In other implementations, program instructions and/or data may be received, sent or stored upon different types of computer-accessible media, such as non-transitory media, or on similar media separate from the non-transitory computer-readable storage medium 920 or the control system 900. Generally speaking, a non-transitory, computer-readable storage medium may include storage media or memory media such as magnetic or optical media, e.g., disk or CD/DVD-ROM, coupled to the control system 900 via the I/O interface 930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 940.

In one implementation, the I/O interface 930 may be configured to coordinate I/O traffic between the processors 910A-910N, the non-transitory computer-readable storage medium 920, and any peripheral devices, including the network interface 940 or other peripheral interfaces, such as input/output devices 950. In some implementations, the I/O interface 930 may perform any necessary protocol, timing or other data transformations to convert data signals from one component (e.g., non-transitory computer-readable storage medium 920) into a format suitable for use by another component (e.g., processors 910A-910N). In some implementations, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some implementations, some or all of the functionality of the I/O interface 930, such as an interface to the non-transitory computer-readable storage medium 920, may be incorporated directly into the processors 910A-910N.

The network interface 940 may be configured to allow data to be exchanged between the control system 900 and other devices attached to a network, such as other control systems, material handling system controllers, warehouse management systems, other computer systems, robotic arms, machines, or systems, imaging devices, cameras, or sensors, depth or ranging sensors, various other types of sensors, other material handling systems, equipment, or processes, or between nodes of the control system 900. In various implementations, the network interface 940 may support communication via wired or wireless general data networks, such as any suitable type of Ethernet network.

Input/output devices 950 may, in some implementations, include one or more displays, screens, monitors, projection devices, imaging sensors, cameras, other visual input/output devices, speakers, microphones, other audio input/output devices, keyboards, keypads, touchpads, scanning devices, sensors, photo eyes, proximity sensors, RFID readers, voice or optical recognition devices, or any other devices suitable for entering or retrieving data by one or more control systems 900. Multiple input/output devices 950 may be present in the control system 900 or may be distributed on various nodes of the control system 900. In some implementations, similar input/output devices may be separate from the control system 900 and may interact with one or more nodes of the control system 900 through a wired or wireless connection, such as over the network interface 940.

As shown in FIG. 9, the memory 920 may include program instructions 925 that may be configured to implement one or more of the described implementations and/or provide data storage 935, which may comprise various tables, data stores and/or other data structures accessible by the program instructions 925. The program instructions 925 may include various executable instructions, programs, or applications to facilitate various operations and processes described herein, such as data collection system controllers, drivers, or applications, robotic arm, machine, or apparatus controllers, drivers, or applications, imaging and depth sensor controllers, drivers, or applications, light panel controllers, drivers, or applications, imaging data processing controllers, drivers, or applications, occupancy mask processing controllers, drivers, or applications, depth data processing controllers, drivers, or applications, monocular depth prediction model controllers, drivers, or applications, depth map processing controllers, drivers, or applications, occupancy correction model controllers, drivers, or applications, inpainting model controllers, drivers, or applications, material handling equipment controllers, drivers, or applications, etc. The data storage 935 may include various data stores for maintaining data related to systems, operations, or processes described herein, such as data collection system data, robotic arm data, imaging sensor data, depth sensor data, light panel data, inventory holder, compartment, and item data, translucent band data, imaging data, depth data, occupancy mask data, depth map data, perspective data, depth threshold data, orthographic projection data, etc.

The control system 900 may also include a monocular depth prediction model 932, which may comprise one or more machine learning models or algorithms configured to perform various operations, functions, or processes described herein at least with respect to FIGS. 2 and 3. The control system 900 may also include various occupancy correction models 934, which may perform various operations, functions, or processes described herein at least with respect to FIGS. 4A-7. The control system 900 may also include a translucent occlusion inpainting model 936, which may comprise one or more machine learning models or algorithms configured to perform various operations, functions, or processes described herein at least with respect to FIG. 8.

Those skilled in the art will appreciate that the control system 900 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the schematic flow diagrams shown in FIGS. 2, 3, 6A, 7, and 8, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to determine available storage space, comprising:
receiving, by a control system from an imaging device, imaging data of an inventory holder including at least one compartment and at least one translucent band at least partially occluding the at least one compartment;
extracting, by the control system, a representation of a single compartment from the imaging data;
segmenting, by the control system, the representation of the single compartment to generate an occupancy mask for the single compartment;
processing, by the control system, the imaging data using a monocular depth prediction model to generate a depth map associated with the inventory holder;
extracting, by the control system, a representation of the single compartment from the depth map to generate a compartment depth map;
processing, by the control system, the occupancy mask for the single compartment using at least one occupancy correction model to generate a corrected occupancy mask, the at least one occupancy correction model utilizing the compartment depth map; and
determining, by the control system, available storage space within the single compartment of the inventory holder based at least in part on the corrected occupancy mask.

2. The computer-implemented method of claim 1, wherein the at least one occupancy correction model comprises a perspective correction model that generates the corrected occupancy mask based at least in part on a perspective of the imaging device relative to the single compartment, and the compartment depth map.

3. The computer-implemented method of claim 1, wherein the at least one occupancy correction model comprises a depth-based correction model that generates the corrected occupancy mask based at least in part on one or more depth thresholds applied to the occupancy mask, and the compartment depth map.

4. The computer-implemented method of claim 1, wherein the at least one occupancy correction model comprises an orthographic correction model that generates the corrected occupancy mask using an orthographic projection generated based at least in part on the compartment depth map.

5. A method, comprising:
receiving, by a control system from an imaging device, imaging data of an inventory holder including at least one compartment and at least one translucent band at least partially occluding the at least one compartment;
processing, by the control system, the imaging data using a monocular depth prediction model to generate a depth map associated with the inventory holder and the at least one compartment; and
determining, by the control system, available storage space within the at least one compartment of the inventory holder based at least in part on the depth map.

6. The method of claim 5, wherein the monocular depth prediction model receives, as input, the imaging data including the at least one compartment and the at least one translucent band.

7. The method of claim 6, wherein the monocular depth prediction model is trained to ignore the at least one translucent band in order to generate the depth map associated with the inventory holder and the at least one compartment.

8. The method of claim 7, wherein the monocular depth prediction model is trained using training imaging data of inventory holders including at least one compartment and at least one translucent band at least partially occluding the at least one compartment, and training depth data of the inventory holders including the at least one compartment without the at least one translucent band.

9. The method of claim 8, wherein the training imaging data is captured by an RGB (red-green-blue) imaging device; and
wherein the training depth data is captured by at least one of a pair of passive stereo imaging devices, or an active depth sensor.

10. The method of claim 9, wherein the RGB imaging device and the at least one of the pair of passive stereo imaging device or the active depth sensor are coupled to and moved by a robotic arm to capture the training imaging data and the training depth data.

11. The method of claim 5, further comprising:
extracting, by the control system, a representation of a single compartment from the imaging data; and
segmenting, by the control system, the representation of the single compartment to generate an occupancy mask for the single compartment.

12. The method of claim 11, further comprising:
extracting, by the control system, a representation of the single compartment from the depth map to generate a compartment depth map; and
processing, by the control system, the occupancy mask for the single compartment using at least one occupancy correction model to generate a corrected occupancy mask, the at least one occupancy correction model utilizing the compartment depth map;
wherein the available storage space within the at least one compartment of the inventory holder is further determined based on the corrected occupancy mask.

13. The method of claim 12, wherein the at least one occupancy correction model comprises a perspective correction model that generates the corrected occupancy mask based at least in part on a perspective of the imaging device relative to the single compartment, and the compartment depth map.

14. The method of claim 12, wherein the at least one occupancy correction model comprises a depth-based correction model that generates the corrected occupancy mask based at least in part on one or more depth thresholds applied to the occupancy mask.

15. The method of claim 12, wherein the at least one occupancy correction model comprises an orthographic correction model that generates the corrected occupancy mask using an orthographic projection generated based at least in part on the compartment depth map.

16. A method to train a monocular depth prediction model, comprising:
moving, by a robotic arm, an imaging device and a depth sensor relative to a plurality of compartments of an inventory holder to capture training imaging data and training depth data;
capturing, by the imaging device, the training imaging data of the plurality of compartments and at least one translucent band at least partially occluding a portion of the plurality of compartments;
capturing, by the depth sensor, the training depth data of the plurality of compartments without the at least one translucent band; and
training, by a control system, a monocular depth prediction model, using the training imaging data and the training depth data, to generate a depth map associated with the inventory holder and the plurality of compartments.

17. The method of claim 16, further comprising:
illuminating, by at least one light panel, the plurality of compartments with at least approximately 1000 lux of light at approximately 6500 degrees of Kelvin (K) color temperature during capture of the training imaging data and the training depth data.

18. The method of claim 16, wherein the depth sensor comprises at least one of a pair of passive stereo imaging devices, or an active depth sensor.

19. The method of claim 18, wherein the training depth data comprises ground truth depth labels associated with the inventory holder and the plurality of compartments.

20. The method of claim 16, wherein the monocular depth prediction model is trained to ignore the at least one translucent band in order to generate the depth map associated with the inventory holder and the plurality of compartments.

* * * * *